United States Patent [19]

Pierce

[11] 4,244,771
[45] Jan. 13, 1981

[54] THERMOPLASTIC SHEET STRIP HEATER ASSEMBLY

[76] Inventor: Larry L. Pierce, 4120 Vansant Rd., Douglasville, Ga. 30135

[21] Appl. No.: 966,570

[22] Filed: Dec. 5, 1978

Related U.S. Application Data

[63] Continuation-in-part of Ser. No. 761,125, Jan. 21, 1977, abandoned.

[51] Int. Cl.³ .................. B32B 31/00; B30B 5/02; H05B 1/00; H05B 3/06
[52] U.S. Cl. .................. 156/499; 156/583.9; 219/243; 219/524; 219/540
[58] Field of Search ........... 219/243, 245, 521, 524, 219/525, 530, 535, 540; 83/16, 171; 156/378, 380, 499, 515, 583, 583.8, 583.9; 65/56, 63, 289; 225/935; 264/210, 285, 339; 425/384, 404, 445; 53/182 R; 143/176; 269/318

[56] References Cited
U.S. PATENT DOCUMENTS

| | | | |
|---|---|---|---|
| 230,905 | 8/1880 | Stow et al. | 269/318 |
| 2,498,865 | 2/1950 | Snow | 143/176 |
| 2,607,876 | 8/1952 | Bergen et al. | 219/521 |
| 3,321,353 | 5/1967 | Zelnick | 53/182 R |
| 3,444,029 | 5/1969 | Renand et al. | 156/380 |
| 3,472,721 | 10/1969 | Abramson et al. | 156/380 X |
| 3,569,667 | 3/1971 | Ryswick | 219/243 |
| 3,635,777 | 1/1972 | Bethge | 156/499 |
| 4,021,639 | 5/1977 | Espino | 219/243 X |
| 4,034,205 | 7/1977 | Reichel | 219/385 |
| 4,045,272 | 8/1977 | Lombardi | 156/380 |

Primary Examiner—Douglas J. Drummond
Attorney, Agent, or Firm—Jones, Thomas & Askew

[57] ABSTRACT

A thermoplastic sheet strip heater assembly (9), for heating a strip of a sheet of plastic material, comprises a heater housing (10) including a heat development channel (22) with a heat escape flue (25) defined in a bed of insulation (20), a sheet support surface (33, 34) located above the channel with a central opening (39) aligned with the flue, a protective grid (28) covering the flue, strip insulation (30,31) between the bed of insulation and the sheet support surface, strips of shielding material (40) for varying the width of the flue, and an adjustable positioning device.

26 Claims, 7 Drawing Figures

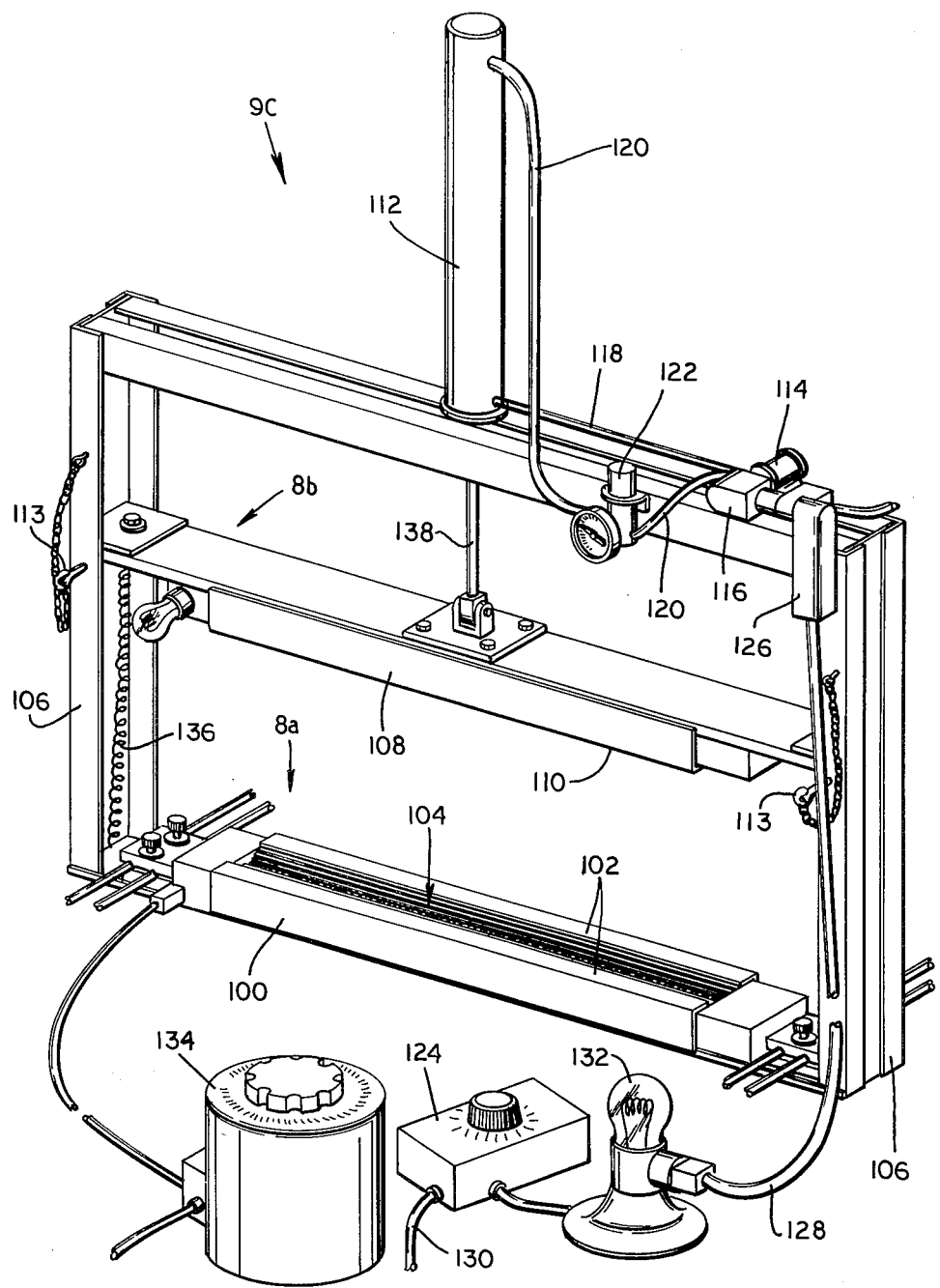
Fig_7

4,244,771

THERMOPLASTIC SHEET STRIP HEATER ASSEMBLY

DESCRIPTION

Cross-Reference to Related Application

This application is a continuation-in-part of my previous application Ser. No. 761,125 filed Jan. 21, 1977, now abandoned.

BACKGROUND OF THE INVENTION

This invention relates to thermoplastic sheet strip heaters.

Heaters have heretofore been devised for heating thermoplastic materials and products in order to soften the material and render it readily workable. U.S. Pat. No. 3,816,705, for example, discloses a heater specially adapted to heat thermoplastic eyeglass frames in order to soften them to permit insertion of lenses or to bend them to fit the face and head of a user. Strip heaters have also been devised for heating selected strip portions of thermoplastic materials in sheet form in order to render them bendable along the heated strip without having to heat other portions that are not to be bent or worked. U.S. Pat. No. 4,034,205 provides one example of such prior art strip heaters. The American Cynamid Company, Plastics Division, of Wallingford, Connecticut discloses a flat strip heater in their Acrylite Acrylic Sheet Fabrication Manual (1970) as does the Rohn and Haas Company of Philadelphia, Pennsylvannia in their 1971 handbook titled *Fabrication of Plexiglas*. Rohm and Haas also illustrates a strip heater in their 1974 brochure titled *Do It Yourself With Plexiglas*, Third Edition. The Briscoe Manufacturing Company of Columbus, Ohio further offers a strip heater referred to as the Briskeat RH-36 Heating Element for use in working with Rohm and Haas' Plexiglas acrylic plastic.

Strip heaters are relatively basic in construction and unrefined in operating efficiency. For example, the prior strip heaters appear to have had problems maintaining consistent and controllable heat development within the housing, especially in regards to those heaters which attempt to vary the effective heating width of the heater. Furthermore, side walls of the heater housings of prior heaters have had a tendency to warp in actual use as a result of extreme amounts of heat. This warping appears to be a source of non-uniform heating width along the length of the flue. Prior art heaters also generally create sharply defined lines, known in the trade as "mark-offs", between adjacent-heated and non-heated areas of the plastic sheet. This "mark-off" is undesirable and is often due to restricted lateral heat dissipation resulting from the unsatisfactory design of prior art heaters. Strip heaters have not, in general, provided the user with the ability to readily locate the to-be-heated portion of the plastic over the heater opening, and those heaters which have provided such capability have been large and cumbersome. Strip heaters have also failed, in the past, to have good capability for heating multiple, spaced strips of sheet material simultaneously and without having to relocate the work piece. Strip heaters of the double type which are adapted to heat both sides of a sheet strip simultaneously have not been provided with means for successfully assuring a flush placement of both heater housings against the work piece. Nor have they been provided with means for automatically timing heating operations.

SUMMARY OF THE INVENTION

Briefly described, the present invention comprises an improved, lightweight thermoplastic strip heater assembly which comprises a trough-shaped housing including spaced apart, fixed side walls mounted at their bottom portions to a base board and including laterally extending flanges displaced inwardly from the top edges of each side wall. The lateral flanges are spaced apart to define a central opening lengthwise along the housing. A bed of insulation is positioned within the housing and an elongated heat development channel, through which is extended a heating element, is formed in the bed of insulation. A heat escape flue is formed in the bed of insulation along the length of the channel in alignment with the central opening of the housing. A broad weave grid or guard is positioned on top of the bed of insulation beneath the lateral flanges and spanning the elongated channel. On either side of the bed of insulation, between the grid and each lateral flange, is positioned a soft, flexible strip of insulation on top of removable strips of heat shielding material. Position indexing means are provided for locating an end of a sheet of thermoplastic material at varying distances from the flue and thereby locating a strip to be heated.

In another form of the invention, an upper and a lower thermoplastic sheet strip heater of the previously described design are positioned one above the other with their respective flues in vertical alignment. Positioning means are further provided for moving the upper housing between a raised position spacially separated from the lower heater and in a lowered position with the upper and lower heaters in mutual flush abutment against opposite surfaces of sheet material positioned between the upper and lower housings.

Accordingly, it is a general object of the present invention to provide an improved thermoplastic sheet strip heater.

More specifically, it is an object of the invention to provide a thermoplastic sheet strip heater with means for maintaining consistent and controllable heat development within the housing.

Still another object of the present invention is to provide a thermoplastic sheet strip heater with means for providing uniform heating width along the length of the heated strip and desirable heat dissipation laterally along the heated strip.

Yet another object of the present invention is to provide a controllable, consistent thermoplastic sheet strip heater with an adjustable flue width.

Another object of the invention is to provide a thermoplastic sheet strip heater with means for readily locating a preselected strip over the heater flue.

Another object of the invention is to provide a thermoplastic sheet strip heater with improved capability for simultaneously heating multiple, mutually separated strips of a single sheet of material.

Another object of the invention is to provide a thermoplastic sheet strip heater of the type just described with means for selectively energizing selected resistance heating elements.

Yet another object of the invention is to provide a thermoplastic sheet strip heater of the double element type having improved means for positioning the upper heater housing during operation.

Still another object of the invention is to provide a thermoplastic sheet strip heater with means for automatically timing a heating operation.

Other objects, features and advantages of the present invention will become apparent upon reading the following specification, when taken in conjunction with the accompanying drawings.

BRIEF DESCRIPTION OF THE DRAWINGS

FIG. 7 is a perspective view of a thermoplastic sheet strip heater assembly embodying principles of the invention in still another form.

DESCRIPTION OF THE PREFERRED EMBODIMENTS

Figure 1:
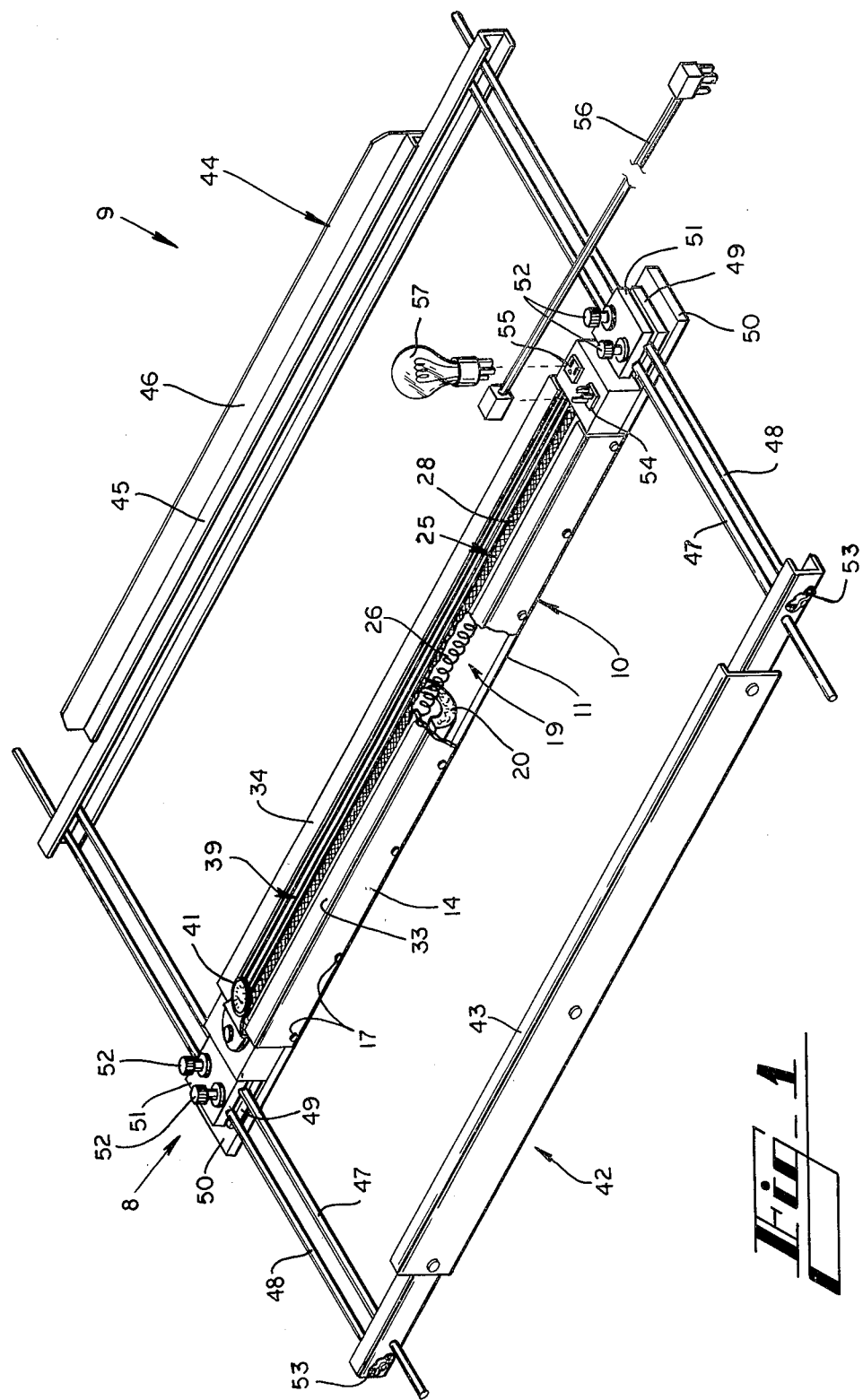
FIG. 1 is a perspective view with portions broken away of a thermoplastic sheet strip heater assembly with a single heating unit embodying principles of the invention in one preferred form.
Figure 3:
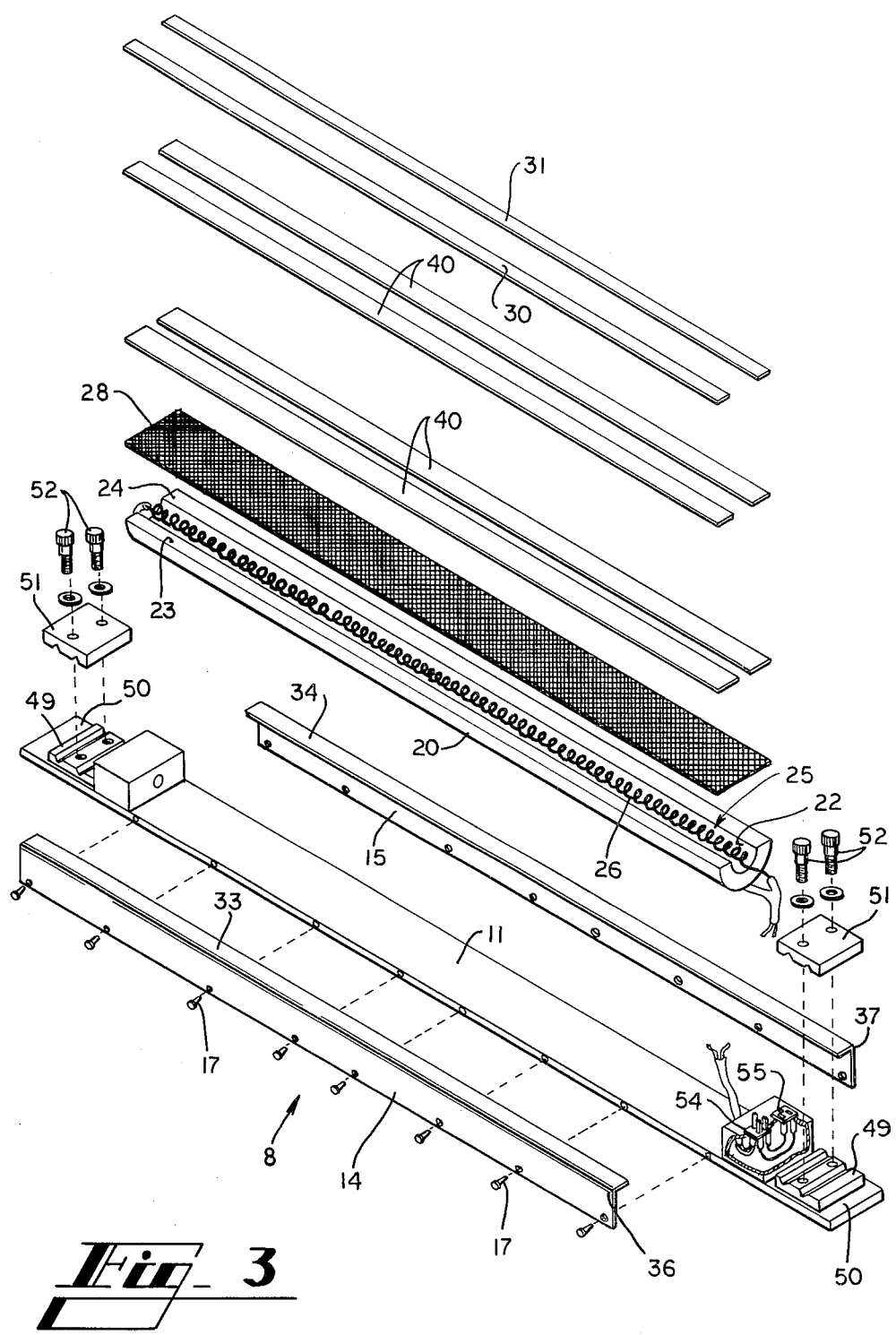
FIG. 3 is an exploded view, shown in perspective, of a portion of a heating unit of the strip heater assembly illustrated in FIG. 1.
Figure 4:
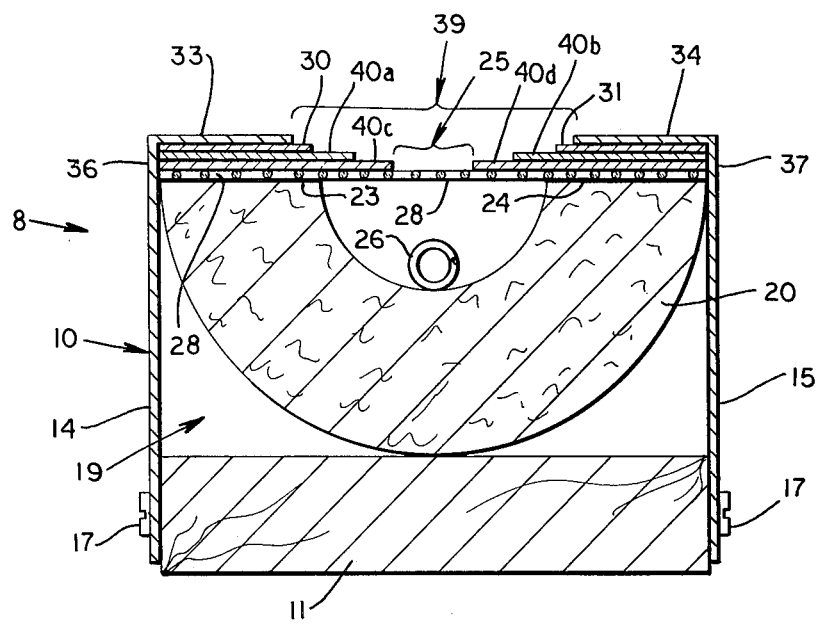
FIG. 4 is a cross-sectional end view of the portion of the heating unit of the strip heater assembly illustrated in FIG. 3.

Referring now in more detail to the drawing, there is shown in FIGS. 1, 3 and 4 a thermoplastic sheet strip heater assembly 9 comprising an elongated heating unit 8 comprising housing 10 including a base board 11 and opposing elongated side walls 14, 15. The side walls 14, 15 are attached at their bottom edges to the base board 11 by self tapping screws 17 and are thus fixed in a spaced apart relationship defining an elongated cavity 19 therebetween. An elongated bed of insulation 20 occupies the cavity 19, extending approximately the length of the housing 10, and defines an elongated upwardly opening channel 22 extending along the length of the bed of insulation 20 between two flat upper surfaces 23, 24. In the preferred embodiment, the bed of insulation 20 is formed into a semicircular cross-section and the channel 22 is likewise approximately tubular. The invention is not, however, limited by these disclosed shapes of insulation 20 and channel 22. The channel 22 serves as a heat development channel and includes a heat escape flue 25, the maximum flue width of which is the maximum width of the channel between the two flat upper surfaces 23, 24. In the channel 22 there is mounted an electric resistance heating element 26 extending the length of the channel. The heating element 26 comprises a single wire element formed in an elongated coil or spiral.

A broad weave grid 28 is positioned on top of the bed of insulation 20 and extends over both flat upper surfaces 23, 24 and spans across the channel 22 along the full length of the bed of insulation. The grid material is preferably a material of low conductivity such as a broad weave teflon coated glass cloth. Two strips of soft, flexible thermal insulation material 30, 31, such as tape asbestos, are positioned above the broad weave grid 28, one strip to each side of the heating element 26. The strips of insulation material 30, 31 do not extend beyond the flat upper surfaces 23, 24 of the bed of insulation 20, that is, they do not extend out over the channel 22. A lateral sheet support flange 33, 34 extends from the top edges 36, 37 of each side wall 14, 15 parallel to the flat upper surfaces 23, 24 of the bed of insulation 20. The flanges 33, 34 extend over the strips of insulation material 30, 31 to partially cover the housing cavity 19, but are spaced apart to form between them a central opening 39 slightly larger than the width of the channel 22. That is, larger than the maximum flue width. The strips of insulation material 30, 31 between the flanges 33, 34 and the flat upper surfaces 23, 24 of the bed of insulation 20, maintain the flanges 33, 34 at least a minimum distance above the surface of the bed of insulation 20. Among other functions, these strips of insulation 30, 31 by maintaining this minimum distance, promotes the disspitation of heat laterally along the strip to be heated after the heat has escaped from the flue 25.

Preferably, each lateral flange 33, 34 and its respective side walls 14, 15 are one integrally formed unit and are preferably metallic, such as aluminum. The base board 11, side walls 14, 15 and lateral flanges 33, 34 cooperate to hold the bed of insulation 20 in its preferred shape and to maintain a housing 10 of fixed dimensions. The broad weave grid 28 functions as a guard 28 to prevent objects from contacting the heating element 26. The guard 28 comprises preferably a teflon coated woven glass cloth of open porosity. A thermometer 41 may also be mounted to the housing 10 above the flue to provide a direct reading of heating temperatures.

A number of removeable strips of heat shielding material, or heat shielding strips 40 are positioned between the broad weave grid 28 and the strip thermal insulation 30, 31 on each side of the channel 22. The heat shielding strips 40a, 40b are used to selectively vary the width of the flue 25. Each heat shielding strip 40 is of a width at least wider than the flat upper surfaces 23, 24 in order that each shielding strip may abut one of the side walls 14, 15 and extend out over the channel 22 to decrease the width of the heat escape flue 25. Abutting one end of the shielding strips 40 against a side wall 14, 15 is a means of providing that the flue 25, as narrowed by the other end of the shielding strip, will be of approximately uniform width along the entire length of the flue. The heater assembly 9 as seen in FIGS. 3 and 4 is shown as comprising four heat shielding strips 40, two upper strips 40a, 40b located on top of the two lower strips 40c, 40d. The two upper shielding strips 40a, 40b are shown as being of equal width. The two lower shielding strips 40c, 40d are shown as being of equal width and are each wider than either of the upper shielding strips 40a, 40b one-quarter inch wider in the preferred embodiment. In operation, the heat shielding strips 40a, 40b, 40c, 40d function to alter the width of the heat escape flue 25. By varying the combination of shielding strips 40, the flue width can be altered by stepped increments. For example, in the embodiment shown in FIG. 4, the maximum flue width is achieved by removing all shielding strips 40; the minimum flue width is achieved by reinserting a combination of strip 40c in one side of the housing 10 under flange 33 and strip 40d in the other side of the housing under flange 34; intermediate flue widths, in order of decreasing width, can be achieved by the following shielding strip combinations: 40a alone; 40a and 40b; 40a and 40c. It is understood as being within the scope of the present invention that there may be available to the user more or less than the four shielding strips depicted in the drawings, and that all of the strips may be of different widths to provide a greater selection of flue widths. Furthermore, the double layer of shielding strips depicted in the drawings is not essential to the inventive concept herein disclosed as the invented heater assembly will often be operated with no shielding strips 40, or one or two strips as explained previously.

The heat shielding strips 40 preferably comprise material of low conductivity or which is non-conductive within the temperature range of the heater and which will not tend to expand under extreme heat. The shielding strips 40 should possess the qualities of a radiant heat shield that will force the majority of heat radiated from the heating element 26 to escape through the narrowed flue opening 25. A preferred example of the heat shielding strip 40 comprises tightly woven, teflon coated glass cloth (fiberglass). The strip insulation 30, 31, grid 28 and shielding strips 40 are all preferably flexible so as to minimize the possibilities of warpage resulting from the excessive exposure to heat.

With continued reference to FIG. 1 the strip heater assembly 9 is seen further to comprise position indexing unit for locating an end of a thermoplastic sheet (not shown) relative to flue 25 and thereby locating a strip portion of the sheet to be heated. The position indexing unit includes a platform 42 having its upper surface 43 generally coplanar with the top, mutually coplanar upper surfaces of lateral flanges 33, 34. Similarly, another platform 44 is located on the other side of the housing 10 and flue 25 with its upper flat surface 45 also coplanar with that of the two lateral flanges 33, 34. This platform 44 however is provided with an upright stop 46 mounted to the end of the platform distal the flue 25.

A pair of guide rods 47 and 48 extend from each end of housing 10 to the top platforms 42 and 44. A central portion of each guide rod 47, 48 rests within a groove formed in the upper surface of a block 49 which is rigidly mounted atop a wing extension 50 of housing 10. A capping block 51, having a groove formed in its lower surface to receive each rod is releasably mounted atop block 49 by a pair of threaded set screws 52. Rods 47 slidably extend through apertures in platform 42 while rods 48 slidably extend through apertures in platform 44. Conversely, the ends of rods 48 are secured to platform 42 by wing nuts 53 and interior nuts (not shown) and the ends of rods 47 are similarly secured to platform 44.

A male electric plug 54 and a female receptacle or socket 55 are mounted atop housing 10 adjacent one end of flue 25. The electric resistance heating element 26 is connected across two of the male plug terminals as are two female terminals of the socket. An extension cord 56 is provided to couple plug 54 to a source of electric current and an incandescent lamp 57 is provided to be mounted upon socket 55.

In operation, platform 44 may be positioned at a desired distance from the flue 25 by momentarily loosening set screws 52 and sliding the platform 44 and guide rods 47 and then tightening the set screws once the proper spacing has been obtained. This spacing then corresponds to the distance from a thermoplastic sheet edge or bend to the strip along which a new bend is to be made. The heating element 26 is now energized and a sheet of thermoplastic material set upon the sheet support flanges 33, 34, functioning as a sheet support surface of the housing 18, with an edge of the material setting on platform 44 in abutment with stop 46. Once the strip has been sufficiently heated to effect softening or wilting, the bend is made and the material preferably placed into a jig for cooling and setting.

Figure 2:
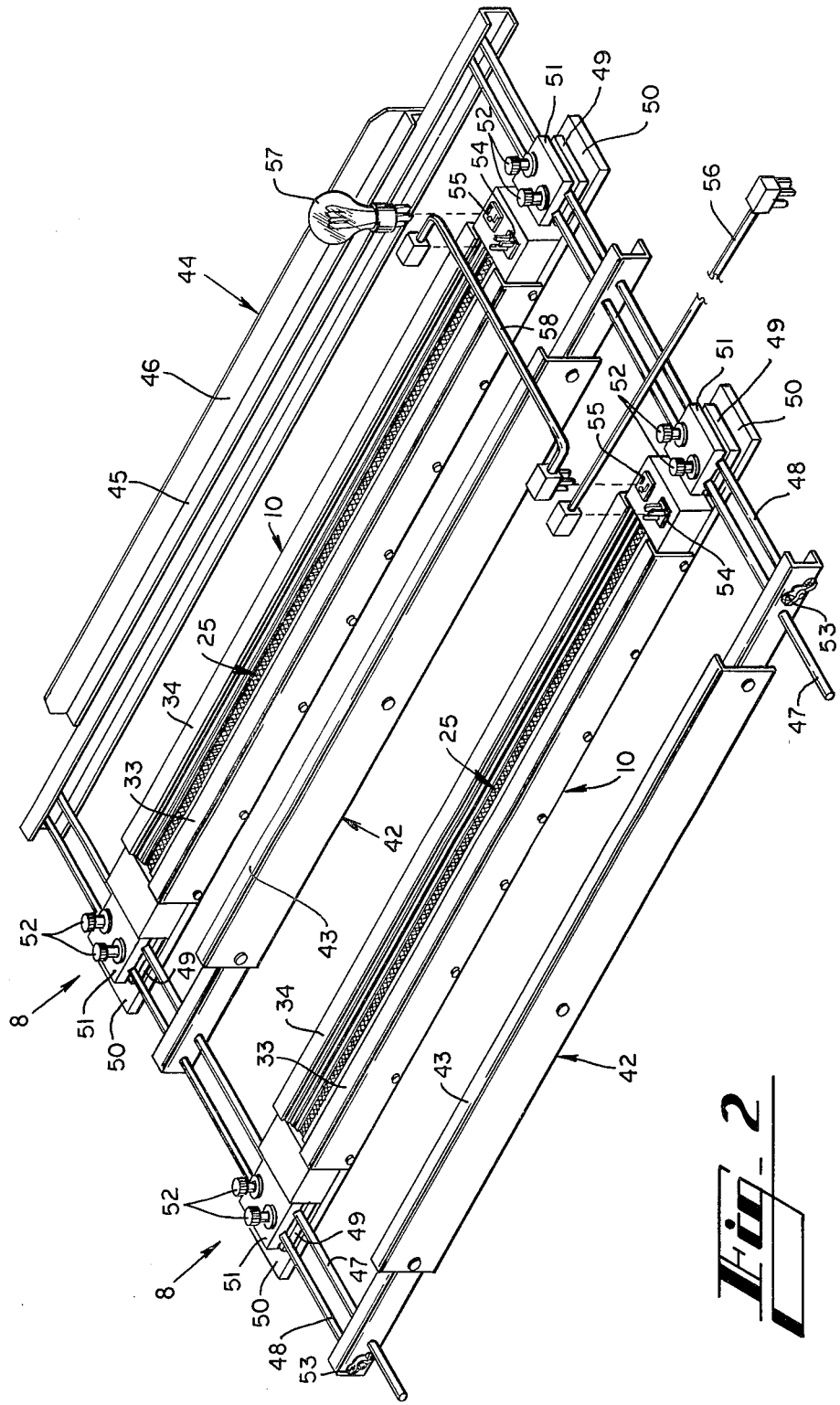
FIG. 2 is a perspective view of a modified form of the strip heater assembly shown in FIG. 1, but which includes two heating units.

With reference next to FIG. 2 the first described strip heater assembly 9 is shown in a modified form comprising two heating units 8 defining a flue 25 therein above unshown resistance heating elements all as just described in conjunction with FIGS. 1, 3 and 4. The two heating units 8 are ganged together along the two pairs of guide rods 47 and 48 with another platform 42 interposed therebetween for added support. A second flexible extension cord 58 is provided to couple the plug 54 mounted on one housing to the socket 55 mounted on the other. With this arrangement two spatially separated strips of one unitary sheet of thermoplastic material may be simultaneously heated without loss of the previously described attributes associated with the embodiment shown in FIG. 1.

Figure 5:
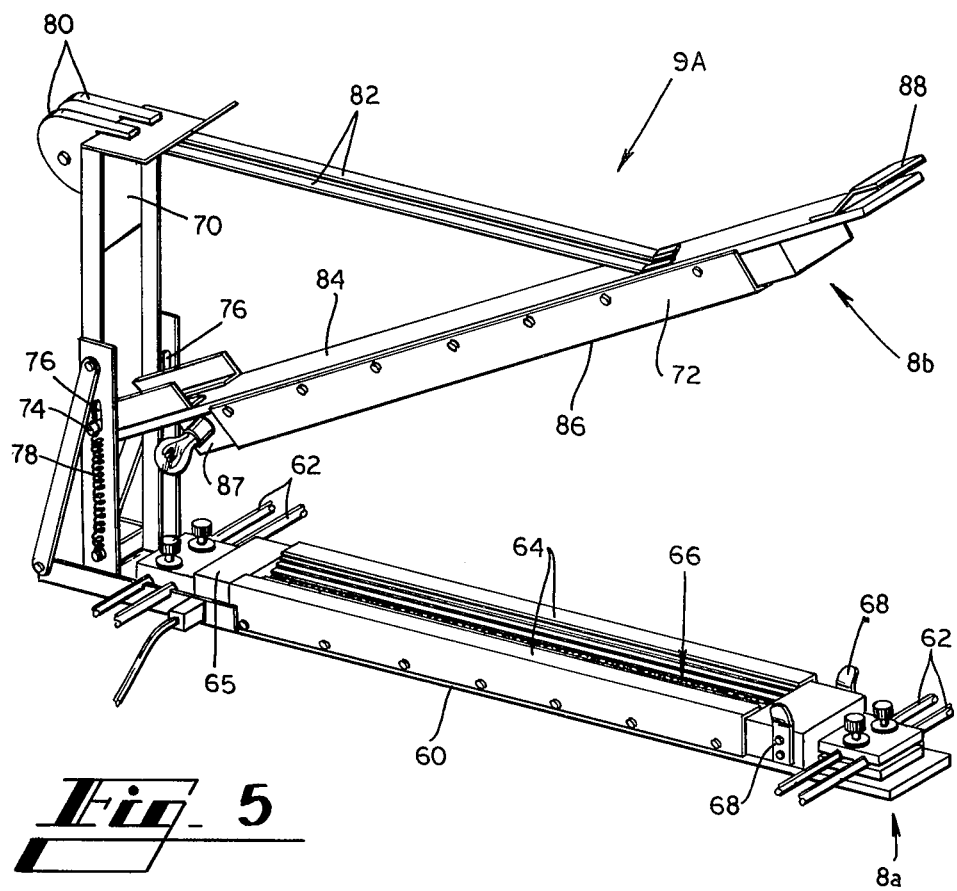
FIG. 5 is a perspective view of a thermoplastic sheet strip heater assembly embodying principles of the invention in another preferred form.

With reference next to FIG. 5 another thermoplastic sheet strip heater assembly 9a is shown having a lower heating unit 8a which is similar to the unit 8 of FIG. 1 and which comprises generally trough-shaped housing 60 in which is mounted an unshown electric resistance heating element and which includes the position indexing means previously described that includes the guide rods 62. The heater assembly 9a has a lower pair of lateral flanges 64, having coplanar upper material contacting surfaces, spaced apart to define a central opening over a lower flue 66 similar to flue 25 described in connection with FIGS. 1, 3 and 4. A pair of upright, flared guides 68 are mounted to one end while an upright support 70 is mounted to the other end. An upper heating unit 8b which is similar to unit 8 of FIG. 1 and which comprises generally inverted trough-shaped housing 72 is pivoted to the upright support 70 by a pair of coaxial pivot pins 74 slidably disposed with vertical slots 76 formed in support 70. Tension springs 78 bias the pivot pins downwardly. Two coiled spring take-up reels 80 are mounted to the top of the upright support from which extend metallic tapes 82 with their ends affixed to rthe top 84 of housing 72. Again, a resistance heater is housed within the upper housing over a flue formed as previously described. A handle 88 is provided at the end of the housing distal support 70.

For operation the upper heating unit 8b may be raised to the position shown, the heating elements energized, and a sheet of thermoplastic material placed upon the material contacting surfaces of lateral sheet support flanges 64 over flue 66. The upper heating unit 8b may then be lowered by manually urging handle 88 downwardly causing the upper housing to pivot into contact with the top of the sheet. As the end 87 of the upper housing 72 contact the end 65 of lower housing 60 adjacent the upright support 70 that end 87 of the upper housing 72 is forced slightly upwardly overcoming the bias of springs 78. Simultaneously, flared guides 68 guide and hold the other end of the upper housing snuggly upon the material with the material contacting surfaces of the flanges 64 and 86 flush against the material and with the upper and lower flues laterally aligned. Upon completion of material heating the upper heating unit 8b is raised thereby enabling the sheet of thermoplastic material to be removed and formed. Once raised the take-up reels 80 hold the upper heating unit 8b in place.

Figure 6:
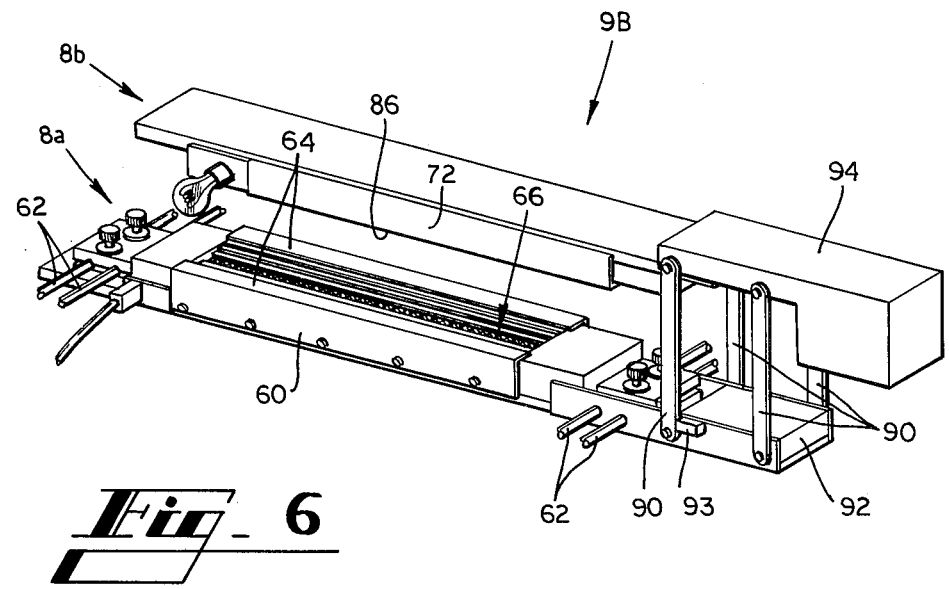
FIG. 6 is a perspective view of a thermoplastic sheet strip heater assembly illustrating principles of the invention in yet another form.

A similar double element strip heater assembly 9b is shown in FIG. 6 in which the means for positioning the upper heating unit 8b comprises parallelogramic linkage consisting of four links 90 pivoted to a wing extension 92 of the lower heating unit 8b and to a wing extension 94 of upper heating unit 8b. This linkage also permits the upper housing 72 to be lowered flush upon the lower housing 60. Stops 93 limit movement of the linkage and enable it to hold the upper heating unit 8b in a raised position. With either the spring biased pivot of FIG. 5 or parallelogramic linkage of FIG. 6, means are provided for positioning the upper housing 72 in a lower position flush upon the lower housing 60 in parallel, axial alignment, and in a raised position out of parallel axial alignment.

In FIG. 7 a thermoplastic sheet strip heater assembly 9c is shown having means for automatically raising an upper heater heating unit 8b from a lower one 8a after the elapse of a preselected period of time. The heater assembly 9c here again comprises a lower heating unit 8a similar to unit 8 of FIG. 1 and including trough-shaped housing 100 having a pair of coplanar flanges 102 defining an opening over a lower flue 104 and an unshown heater element. Two upright tracks 106 are rigidly mounted to opposite ends of the lower heating unit 8a in which an upper heating unit 8b including generally inverted trough-shaped housing 108 is slidably mounted. The upper housing 108 is again provided with a pair of coplanar flanges 110 defining an opening therebetween under an upper flue directly above the lower flue. The size of the flues may be adjusted using heat shielding strips as previously described and multiple double heaters may also be ganged as previously discussed. In this case the upper heating unit 8b is movable between its illustrated raised position to a lower position with flanges 102 and 110 in flush abutment by operation of a double stroke air cylinder 112. Two chained pins 113 are provided for holding the upper heating unit 8b in its raised position when the air cylinder is not energized.

The air cylinder is operated by means of an air valve 114 operated by a solenoid 116. Air line 118 connects the lower end of the cylinder with the valve while an air line 120 connects the upper end of the cylinder to the valve through a pressure regulator 122. The solenoid is coupled to a mechanically set timer 124 to selectively interrupt the flow of current between line 128 and a source of electric current from line 130. An incandescent lamp 132 is also provided to demonstrate activation of timer 124. A Powerstat transformer is provided to regulate the current going to the heating elements and thereby adjust the amount of heat operated by those elements. A flexible cord 136 couples the upper heating element with the lower.

In operation, air, under pressure, is supplied to valve 114 while timer 124 is inactivated to raise upper heating unit 8b to its uppermost position. Pins 113 are then removed. A sheet of material may then be placed upon flanges 102 over flue 104, the heating elements are energized, and timer 124 is manually set. This energizes the lamp, and actuates solenoid 116 to reposition air valve 114 thereby channeling pressurized air through air line 120 enabling cylinder 112 to lower the upper heating unit 8b. Once the selected time has expired timer 124 deenergizes the lamp and actuates solenoid 116 to reposition air valve 114 thereby channeling pressurized air through air line 118 forcing the cylinder piston upwardly as well as the upper housing connected thereto by cylinder rod 138.

It should be understood that the first described embodiments merely illustrate principles of the invention in selected, preferred forms. Many modifications, deletions and additions may, of course, be made thereto without departure from the spirit and scope of the invention as set forth in the following claims.

I claim:

1. A thermoplastic sheet strip heater assembly comprising:
    a bed of heat and electrical insulation material;
    an elongated heat development channel defined by said bed of insulation material, said elongated heat development channel including a heat escape flue defined along the length of said channel;
    an elongated electrical resistance heating element positioned within said heat development channel;
    a broad weave grid positioned adjacent the surface of said bed of insulation spanning across said heat escape flue;
    sheet support flanges located in spaced relationship from said bed of insulation on both sides of said heat escape flue and extending along the length of said flue, a space being defined between each said flange and said bed of insulation;
    strips of flexible thermal insulation material located to either side of said flue in the spaces between said flanges and said bed of insulation;
    at least a first heat shielding strip removably inserted below said strip of flexible insulation material in the space between at least one of said flanges and said bed of insulation, said heat shielding strip extending over a portion of said flue to narrow said flue; and,
    electrical circuit means for energizing said elongated electrical resistance heating element.

2. The thermoplastic sheet strip heater assembly of claim 1 and wherein said heat development channel is semicircular in profile.

3. The thermoplastic sheet strip heater assembly of claim 1 and further comprising a second heat shielding strip removeably inserted in the space between the other of said flanges and said bed of insulation.

4. The thermoplastic sheet strip heater assembly of claim 3 and wherein said first and second heat shielding strips extend equal distances out over said flue.

5. The thermoplastic sheet strip heater assembly of claim 3 and wherein said first and second heat shielding strips extend unequal distances out over said flue.

6. The thermoplastic sheet strip heater assembly of claim 1 and further comprising a housing inside of which is contained said bed of insulation, said housing including a solid bottom wall, two solid opposing side walls and a top wall, said top wall including said sheet support flanges held at a fixed distance apart to define an opening therebetween at least as wide as said flue, said flanges including coplanar flat upper surfaces.

7. The thermoplastic sheet strip heater assembly of claim 6 and further comprising position indexing means for locating an end of a sheet of thermoplastic material at varying distances from said flue, thereby locating a strip on said material to be heated.

8. A thermoplastic sheet strip heater assembly in accordance with claim 6 wherein said position indexing means includes at least one platform along side said housing having an upper surface generally coplanar with said flat upper surfaces of said sheet support flanges.

9. A thermoplastic sheet strip heater assembly in accordance with claim 8 wherein said position indexing means further includes an upright stop mounted on an end of at least one of said platforms, distal said flue.

10. A thermoplastic sheet strip heater assembly in accordance with claim 8 wherein said position indexing means further includes at least one pair of guide rods slidably extending between said housing and said platform.

11. A thermoplastic sheet strip heater assembly in accordance with claim 10 wherein said position indexing means further includes means for releasibly gripping said pair of guide rods mounted to said housing.

12. A thermoplastic sheet strip heater assembly in accordance with claim 10 wherein said guide rods slidably extend beyond said housing to an auxiliary platform having an upper suface generally coplanar said flat upper surfaces of said sheet support flanges and said platform upper surface.

13. A thermoplastic sheet strip heater assembly in accordance with claim 10 comprising a second housing juxtaposed along side said housing to which said pair of rods slidably extend, and a second heat development channel and second electric resistance heating element adapted to be coupled to a source of electric current mounted within said second housing.

14. A thermoplastic sheet strip heater assembly in accordance with claim 13 comprising an electric plug mounted to said housing to which said electric resistance heating element is connected; a socket mounted to said housing and electrically connected to said plug; a second electric plug mounted to said second housing to which said second electric resistance heating element is connected; a second socket mounted to said second housing and electrically connected to said second plug; and a flexible extension cord coupling a plug mounted on one of said housings to a socket mounted on the other of said housings.

15. A thermoplastic sheet strip heater assembly in accordance with claim 14 comprising a second flexible extension cord coupled with said plug, mounted on the other of said housings and having a cord plug adapted to be seated within an auxiliary current energized socket, and a lamp plugged into said socket mounted on said one of said housings.

16. A thermoplastic sheet strip heater assembly comprising:
   an elongated housing including a sheet contacting wall defining a central opening along its length forming two coplanar laterally extending elongated flanges;
   a bed of insulation material contained within said housing;
   a heat development channel defined by said bed of insulation and including a heat escape flue adjacent said sheet contacting wall, said flue being at leat as narrow as said central opening and in alignment with said central opening;
   an elongated electrical resistance heating element positioned within said heat development channel;
   a board weave grid beneath said sheet contacting wall spanning said heat escape flue;
   strips of flexible thermal insulation material located between each of said elongated flanges and said bed of insulation to either side of said flue; and
   at least a first heat shielding strip moveably inserted below said strip of flexible insulation material and above said bed of insulation material, and extending over a portion of said flue to narrow said flue.

17. A thermoplastic sheet strip heater assembly comprising:
   a lower heater;
   an upper heater;
   each said heater comprising an elongated housing including a sheet contacting wall defining a central opening along its length forming two coplanar laterally extending elongated flanges, a bed of insulation material contained within said housing, a heat development channel defined by said bed of insulation and including a heat escape flue adjacent said sheet contacting wall, said flue being at least as narrow as said central opening and in alignment with said central opening, an elongated electrical resistance heating element positioned within said heat development channel, a broad weave grid beneath said sheet contacting wall spanning said heat escape flue, strips of flexible thermal insulation material located between each of said elongated flanges and said bed of insulation to either side of said flue, and at least a first heat shielding strip moveably inserted below said strip of flexible insulation material and above said bed of insulation material, and extending over a portion of said flue to narrow said flue; and
   positioning means for positioning said upper heater in a raised position with said sheet contacting wall of said upper heater and said sheet contacting wall of said lower heater spacially separated and in a lowered position with said sheet contacting wall of said upper heater and said sheet contacting wall of said lower heater in mutual flush abutment.

18. A thermoplastic sheet strip heater assembly in accordance with claim 17 wherein said positioning means includes an upright support rigidly mounted to one end of said lower heater to which said upper heater is pivoted.

19. A thermoplastic sheet strip heater assembly in accordance with claim 18 wherein said positioning means further includes coiled spring take-up means for holding said upper heater at variable positions of incline above said lower heater.

20. A thermoplatic sheet strip heater assembly in accordance with claim 18 wherein said upright support has a vertically extending slot, and wherein said upper heater has a pivot pin slidably positioned within said vertical slot.

21. A thermoplastic sheet strip heater assembly in accordance with claim 20 wherein said positioning means further includes spring means for biasing said upper heater pivot pin downwardly within said upright support slot thereby enabling said sheet contacting wail of said upper heater to be positioned flush upon said sheet contacting wall of said lower heater when said upper heater is pivoted to its lowered position.

22. A thermoplastic sheet strip heater assembly in accordance with claim 17 further comprising guide means for laterally aligning said flue of said upper heater and said flue of said lower heater when said upper heater is in its lowered position.

23. A thermoplastic sheet strip heater assembly in accordance with claim 17 wherein said positioning means includes parallelogramic linkage pivotably mounted to one end of said lower heater and to one end of said upper heater.

24. A thermoplastic sheet strip heater assembly in accordance with claim 17 wherein said positioning means comprises a pair of tracks extending uprightly from opposite ends of said lower heater in which tracks said upper heater is movably disposed.

25. A thermoplastic sheet strip heater assembly in accordance with claim 24 wherein said positioning means further includes air cylinder means for raising and lowering said upper heater along said tracks.

26. A thermoplastic sheet strip heater assembly in accordance with claim 25 wherein said positioning means further includes valve means for controlling operations of said air cylinder and timer means coupled with said valve means for timing operations of said valve means.

* * * * *